Patented Mar. 4, 1941

2,234,140

UNITED STATES PATENT OFFICE 2,234,140

WETTING AGENT IN CYANIDATION

Stuart A. Falconer, Old Greenwich, and Robert B. Booth, Springdale, Conn., assignors to American Cyanamid Company, New York, N. Y., a corporation of Maine No Drawing. Application June 21, 1939, Serial No. 280,350

7 Claims. (Cl. 75—105)

The present invention relates to the cyanide treatment of ores and other materials containing precious metals. It is particularly concerned with a method whereby more complete extraction of gold from ores, concentrates, tailings and the like may be carried out.

The cyanide treatment of ores in which an aqueous alkaline solution of a cyanide is used to dissolve the gold and silver from their ores results in variable amounts of precious metal being left behind in the tailings, dependent upon the type of ore material and the conditions under which the cyanidation is carried out. Therefore, in the recovery of gold by cyanidation, it is usually necessary to determine when a method as applied to a particular ore, concentrate, tailing, etc., may be carried out profitably from a practical viewpoint. There is frequently a compromise between the amount of gold left in the tailings and the cost of the cyanidation. For example, the amount of gold left in a particular tailing may be decreased but the amount of cyanide and the conditions of cyanidation necessary to produce such results are such that the increased gold recovery does not justify the increased cost of production.

Gold ores often contain substances which hinder the recovery by cyaniding or increase the cost of such recovery. For example, carbonaceous ores, concentrates, tailings, and the like are difficult to cyanide profitably as the carbon causes precipitation of gold from the cyanide solution which results in high cost and poor tailings. Ores and the like in which there is surface contamination of the gold prevent the cyanide solution from coming in contact with the gold particles and is responsible for high losses. The present invention is not limited to any particular type ore. However, best results are obtained when the process is used in connection with ores that are difficult to cyanide such as those indicated above.

According to the present invention, ores, concentrates, tailing and the like which contain precious metals are treated with a wetting agent prior to and/or during the cyanidation. This results in some cases to an increase in the amount of gold extracted and in other cases to a reduction in the amount of cyanide used, the net result being a more profitable balance between the gold recovery and the cost of cyaniding.

The present invention is not limited to any particular theoretical explanation of the action of wetting agents in cyanidation, and the following are offered as possible explanations only. Wetting agents may cause more efficient wetting of ore particles and this may facilitate dissolution of the precious metals. On the other hand, certain wetting agents are precipitated in the alkaline media such as might occur in cyanide practice. In the case of carbonaceous ores, this precipitate may form on the surface of the carbon and may thus prevent the carbon from re-precipitating the dissolved precious metals from the cyanide solution. In the case of the surface contaminated precious metals, the wetting agent may change the character of the coating to such an extent that the cyanide solution can more readily come in contact with the metals.

It is an advantage of the present invention that higher recoveries of precious metals by cyanidation are obtained from low grade ores and particularly carbonaceous ores. The increased rate of dissolution of gold from the ore, particularly border line ores, and the fact that lower strength cyanide solutions may be used result in a decreased cost of plant operation. Hence, by employing the present cyaniding process an ore material may be cyanided profitably where it would have been unprofitable before.

It is also an advantage of the invention that the process is not limited to any particular wetting agent and any of the chemical compounds that have wetting power and that are ordinarily used or classified as wetting agents are applicable to the process. It is, of course, to be expected that some wetting agents give better results than others.

Wetting agents of the types such as sulfated high molecular alcohols, sulfonated esters of higher alcohols and dibasic acids, and alkylated aryl sulfonates have been found to give good results. Examples of such wetting agents shown to give the best results include dioctylsulfosuccinc-acid ester, sodium isopropylnaphthalene sulfonate, sodium salt of sulfated oleyl alcohol, sodium lauryl sulfate and a reaction product of oleic acid and 2-aminoethane sulfonic acid.

The present invention is applicable regardless of the stage in the cyanidation process at which the wetting agent is introduced. It may be added directly to the ore during pulverization or to the pulp at a high or low solid concentration, or it may be mixed with the cyanide solution.

The application of the process will be described in greater detail in connection with typical ores as illustrated by the following examples:

EXAMPLE 1

*Treatment of a carbonaceous gold ore*

A sample of a carbonaceous gold ore from South Africa, assaying about 0.20 oz./ton of Au, was agitated with 2.0 lbs./ton of the wetting agent consisting of the sodium salt of sulfated oleyl alcohol for about 12 hours at a plup density of about 50% solids. Cyanide and lime were then added and the agitation continued for 24 hours longer. The solids were filtered off, washed, and dried. The combined pregnant solution and wash solution and dry tailing were assayed for gold.

The results of this test were compared with those of a second test similarly conducted except that no wetting agent was used.

The results of both tests are summarized in the following table:

|  | 2.0 lbs./ton sodium salt of sulfated oleyl alcohol | Oz./ton of Au | Percent Au |
|---|---|---|---|
| Test #1 |  |  |  |
| 24 hr. pregnant solution cubic centimeters | *1,850 | 0.0378 | 60.96 |
| 24 hr. tailing grams | 614.0 | 0.073 | 39.04 |
| Feed |  | 0.187 | 100.0 |
| Test #2 | No wetting agent |  |  |
| 24 hr. pregnant solution cubic centimeters | *2,040 | 0.0268 | 45.00 |
| 24 hr. tailing grams | 608.0 | 0.110 | 55.00 |
| Feed |  | 0.200 | 100.00 |

* Includes wash water.

The above data indicates that the gold content of the cyanidation tailing was substantially reduced by the use of the wetting agent.

Twenty-four hour cyanidation tests on this same ore were also conducted at a pulp density of 25% solids. The ore was ground in separate tests with 1.0 lb./ton of various wetting agents and the resulting pulp, after dilution to about 25% solids, was cyanided for 6 hours. The pregnant solution was then filtered off. The solids were repulped with fresh barren solution and, after the addition of 1.0 lb./ton of wetting agent, cyanidation was continued for 18 hours longer. The solids were then filtered off, washed, and dried. The combined pregnant and wash solutions and dry tailing were assayed for gold.

The results of tests with various wetting agents were compared with those of tests similarly conducted except that no wetting agents were used. The results of all tests at 25% solids are summarized in the following table:

| Test No. 3, no wetting agent | Distribution | | |
|---|---|---|---|
|  | Oz. Au/ton | Percent Au | Percent Au cumulative |
| 6 hr. pregnant soln cc 1,240 | 0.0430 | 42.31 | 42.31 |
| 24 hr. pregnant soln cc *3,030 | .0093 | 22.11 | 64.42 |
| 24 hr. tailing grams 609.0 | .074 | 35.58 | 100.00 |
| Feed | .208 |  |  |
| *Test No. 4, 2.0 lbs./ton sodium lauryl sulfate* |  |  |  |
| 6 hr. pregnant soln cc 1,690 | 0.0460 | 61.24 | 61.24 |
| 24 hr. pregnant soln cc *3,200 | .0063 | 15.79 | 77.03 |
| 24 hr. tailing grams 608.8 | .048 | 22.97 | 100.00 |
| Feed | .209 |  |  |
| *Test No. 5, 2.0 lbs./ton sodium salt of a sulfated alcoholic ether known to the trade as "Tergitol Penetrant No. 7"* |  |  |  |
| 6 hr. pregnant soln cc 1,560 | 0.0408 | 54.17 | 54.17 |
| 24 hr. pregnant soln cc *3,080 | .0065 | 17.19 | 71.36 |
| 24 hr. tailing grams 610.0 | .055 | 28.64 | 100.00 |
| Feed | .192 |  |  |
| *Test No. 6, 2.0 lbs./ton sodium isopropylnaphthalene sulfonate* |  |  |  |
| 6 hr. pregnant soln cc 1,770 | 0.0385 | 57.73 | 57.73 |
| 24 hr. pregnant soln cc *3,050 | .0055 | 13.92 | 71.65 |
| 24 hr. tailing grams 610.5 | .055 | 28.35 | 100.00 |
| Feed | .194 |  |  |
| *Test No. 7, 2.0 lbs./ton sodium dioctylsulfosuccinate* |  |  |  |
| 6 hr. pregnant soln cc 1,670 | 0.0358 | 49.75 | 49.75 |
| 24 hr. pregnant soln cc *3,090 | 0.0068 | 17.26 | 67.01 |
| 24 hr. tailing grams 609.7 | 0.065 | 32.99 | 100.00 |
| Feed | 0.197 |  |  |
| *Test No. 8, 2.0 lbs./ton reaction product of oleic acid and 2-aminoethane sulfonic acid* |  |  |  |
| 6 hr. pregnant soln cc 1,595 | 0.0395 | 52.02 | 52.02 |
| 24 hr. pregnant soln cc *3,400 | 0.0058 | 16.16 | 68.18 |
| 24 hr. tailing grams 610.3 | 0.063 | 31.82 | 100.00 |
| Feed | 0.198 |  |  |

*Includes wash solutions.

The foregoing data on tests at 25% solids indicates that the gold content of the tailings from cyanidation was reduced by the use of the various wetting agents. This reduction was more pronounced in the six hour pregnant solutions which indicated an increased rate of dissolution of the gold.

EXAMPLE 2

*Treatment of non-carbonaceous ore*

A sample of gold ore from the Fiji Islands containing pyrite, sylvanite and quartz, assaying about 1.0 oz./ton of Au, 0.56 oz./ton of Ag, 5.4% Fe, 3.2% S, and 78.9% insoluble was crushed to minus 8 mesh, heated at 200°–660° C. over a period of 45 minutes and, after cooling, treated with a wetting agent. The ore was then cyanided for 6 hours. In the following table, the gold extractions obtained in tests with 1.0 lb./ton of a wetting agent are compared with those of a test in which no wetting agent was used:

| Test No. 9, no wetting agent | Ounce Au/ton | Percent Au |
|---|---|---|
| 6 hr. pregnant soln cc 3,190 | 0.0950 | 50.87 |
| 6 hr. tailing grams 574.4 | 0.510 | 49.13 |
| Feed | 1.038 | 100.00 |
| *Test No. 10, 1.0 lb./ton sodium isopropylnaphthalene sulfonate* |  |  |
| 6 hr. pregnant soln cc 3,350 | 0.893 | 52.63 |
| 6 hr. tailing grams 575.5 | 0.468 | 47.37 |
| Feed | 0.988 | 100.00 |
| *Test No. 11, 1.0 lb./ton sodium dioctylsulfosuccinate* |  |  |
| 6 hr. pregnant soln cc 3,330 | 0.0908 | 53.28 |
| 6 hr. tailing grams 573.2 | 0.463 | 46.72 |
| Feed | 0.991 | 100.00 |

The foregoing data on tests conducted on a non-carbonaceous gold ore after roasting indicates that the gold content of the tailings from the cyanidation was reduced by the use of wetting agents.

The term "wetting agent" as used in the specification and claims is used in its strict sense and has reference to a substance that has a very high surface tension action and does not intend to include such substances as soap that are sometimes loosely referred to as wetting agents.

What we claim is:

1. A process of cyaniding auriferous material which comprises carrying out the cyanidation in the presence of a wetting agent included in the group consisting of sulfated high molecular alcohols, sulfonated esters of higher alcohols and dibasic acids, and alkylated aryl sulfonates.

2. A process of cyaniding auriferous material which comprises carrying out the cyanidation in the presence of a wetting agent of the class sulfosuccinic acid esters of alcohols having at least five carbon atoms.

3. A process of cyaniding auriferous material which comprises carrying out the cyanidation in the presence of a wetting agent of the class alkyl naphthalene sulfonates.

4. A process of cyaniding auriferous material which comprises carrying out the cyanidation in the presence of a wetting agent of the class sulfuric acid esters of an aliphatic alcohol having at least five carbon atoms.

5. A process of cyaniding auriferous material which comprises carrying out the cyanidation in the presence of sodium lauryl sulfate.

6. A process of cyaniding auriferous material which comprises carrying out the cyanidation in the presence of sodium dioctylsulfosuccinate.

7. A process of cyaniding auriferous material which comprises carrying out the cyanidation in the presence of sodium isopropylnaphthalene sulfonate.

STUART A. FALCONER.
ROBERT B. BOOTH.